United States Patent

[11] 3,598,280

| [72] | Inventor | Ross Hukill |
| | | Box 346, Scottsbluff, Nebr. 69361 |
| [21] | Appl. No. | 846,081 |
| [22] | Filed | July 30, 1969 |
| [45] | Patented | Aug. 10, 1971 |

[54] SEED HILLER
1 Claim, 4 Drawing Figs.

[52] U.S. Cl. .................................................. 221/167,
221/264, 222/367, 222/370
[51] Int. Cl. .................................................. B23q 7/12
[50] Field of Search .......................................... 221/264,
222, 277, 42, 167; 239/689; 222/367, 370, 189,
333; 111/51, 77, 51 X

[56] References Cited
UNITED STATES PATENTS
| 3,329,318 | 7/1967 | Swett et al. ................... | 222/189 |
| 2,630,245 | 3/1953 | Maier ........................... | 222/370 |
| 1,951,458 | 3/1934 | White ........................... | 111/51 |
| 541,417 | 6/1895 | Barnhill ....................... | 239/689 |

Primary Examiner—Robert B. Reeves
Assistant Examiner—James M. Slattery

ABSTRACT: A planter for beet seeds, the device comprising a unit wherein the seeds are discharged from a pair of parallel and vertically extending chutes, and wherein the seeds are divided at the top end of the chutes so as to be properly dispensed upon the ground.

PATENTED AUG 10 1971  3,598,280

INVENTOR
ROSS HUKILL

SEED HILLER

This invention relates generally to seed-spacing mechanism. More specifically it relates to a seed planter.

It is generally well known that seed planters have been heretofor designed and covered by U.S. Patents and wherein the seeds are divided at the bottom of a pair of spaced apart tubular chutes but which is less desirable than if the seeds were divided at the top of the parallel chute tubes.

Accordingly, it is the principle object of the present invention to provide a seed planter wherein the seeds are divided at the top of the parallel chute tubes for an improved seeding operation.

Another object of the present invention is to provide a seed hiller wherein one or more seeds dispensed from the tube will be retarded in falling outward of the device. The retarding means will cause the dispensing of approximately two or three seeds per hill, the seeds will be dispensed on said hill a distance of from one to three inches apart, said hills being spaced at intervals of from 8 to 10 inches in each row.

Accordingly it is another object of the present invention to provide a seed hiller wherein the seed planter is provided with a screen at the lower end of the seed planter so as to aid in the dispersion of the seeds.

Other objects of the present invention are to provide a seed hiller which is simple in design, inexpensive to manufacture, rugged in construction, easy to use and efficient in operation.

These and other objects will be readily evident upon a study of the following specification and the accompanying drawing wherein.

Figure 1:
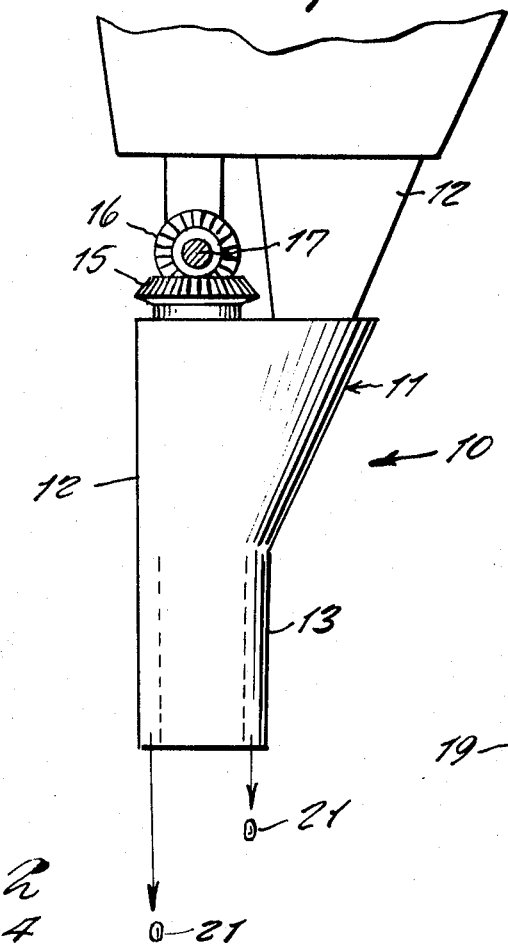
FIG. 1 is a side elevation view of the present invention.

Referring now to the drawing in detail, the reference numeral 10 represents a beet seed hiller according to the present invention wherein there is a unit 11 that includes a discharge hopper, the unit 11 including a sleeve 12 which at its upper end is of conical configuration extending convergingly downward to a lower portion 13 of cylindrical configuration. The sleeve encloses a shaft 14 extending vertically, the upper end of the shaft 14 carrying a bevel gear 15 which is engaged with a bevel gear 16 on a drive shaft 17.

The lower end of the shaft 14 is supported on the upper end of central post 18 integral with the lower portion 13 of the sleeve.

Figure 2:
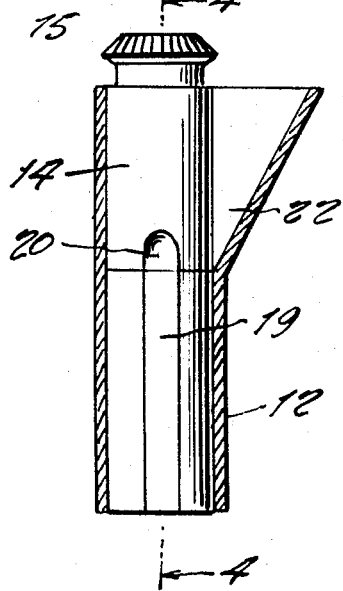
FIG. 2 is a cross-sectional view thereof shown in the same plane as FIG. 1.
Figure 4:
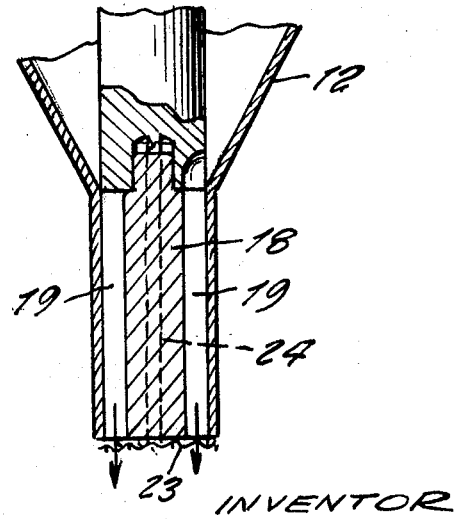
FIG. 4 is a cross-sectional view taken on the line 4-4 of FIG. 2.

The post 18 is provided with a pair of diametrically spaced-apart chute tubes 19 which are alternately aligned with a recess 20 on a lower side to the shaft 14, as shown in FIGS. 2 and 4, so as to allow seeds 21 to be passed therethrough.

In operative use, the shaft 14 is rotated by a power source through the bevel gears 15 and 16. The rotating shaft 14 thus presents the recess 20 to receive a seed 21 deposited from the hopper into the conical portion forming the pocket 22. The seed caught within the recess 20 is thus carried by the rotating shaft until the recess is positioned over one of the chute tubes 19 formed on opposite sides of the post 18. The seed now drops downwardly and out of an outlet end at the bottom.

Figure 3:
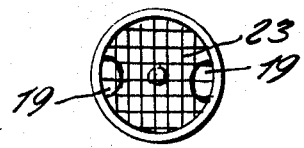
FIG. 3 is a bottom plan view of the seed planter.

In a modified construction as is suggested in FIGS. 3 and 4 of the drawing, a screen 23 on the underside of the unit 11 is attached by a concentrically center shaft 24 to the shaft 14, thus causing the screen 23 to rotate immediately below the lower ends of the chute tubes, the screen 23 serving to disburse the seeds in a desirable manner, as above described.

Thus, in falling down the tube one or more seeds will be retarded in fall and will cause the seed to be scattered on a seed hill a distance of approximately one to three inches apart said hills to be spaced at intervals of from 8 to 10 inches in a row.

What I now claim is:

1. In a hopper, hiller, the combination of a unit positioned below a hopper, said unit comprising a vertically extending sleeve enclosing a vertically extending shaft, said shaft being driven so to discharge seeds from said hopper out of a lower end of said unit, an upper portion of said sleeve being of conical configuration that is downwardly converging adjacent a lower portion of said sleeve, said lower portion being of cylindrical configuration, and said upper portion of said sleeve receiving seeds from said hopper, said shaft having a bevel gear secured to an upper end thereof, said bevel gear being engaged with a bevel gear mounted on a transverse extending drive shaft so to provide driving force to said shaft, said vertically extending shaft being provided with a recess along a lower side portion thereof, said recess being alternately aligned with oppositely diametrically positioned chute tubes in a lower portion of said sleeve, said chute tubes being formed within a stationary central post mounted within a lower portion of said sleeve, said chute tubes extending a full length of said post, and a screen being positioned beneath a lower discharge end of said chute tubes to aid in proper dispensing of said seeds.